United States Patent
Maciorowski

(10) Patent No.: US 8,533,528 B2
(45) Date of Patent: Sep. 10, 2013

(54) FAULT TOLERANT POWER SEQUENCER

(75) Inventor: David Maciorowski, Longmont, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 123 days.

(21) Appl. No.: 12/639,801

(22) Filed: Dec. 16, 2009

(65) Prior Publication Data
US 2011/0145604 A1 Jun. 16, 2011

(51) Int. Cl.
*G06F 11/00* (2006.01)

(52) U.S. Cl.
USPC .......... 714/14; 714/22; 714/24; 713/330

(58) Field of Classification Search
None
See application file for complete search history.

(56) References Cited

U.S. PATENT DOCUMENTS

| | | | | |
|---|---|---|---|---|
| 4,495,568 A * | 1/1985 | Gilbert et al. | ............... | 714/22 |
| 4,663,539 A * | 5/1987 | Sharp et al. | ............... | 307/38 |
| 4,677,566 A * | 6/1987 | Whittaker et al. | ............ | 700/295 |
| 6,718,472 B1 * | 4/2004 | Garnett | ............... | 713/300 |
| 7,124,321 B2 * | 10/2006 | Garnett et al. | ............... | 714/14 |
| 2008/0244311 A1 * | 10/2008 | Elliott et al. | ............... | 714/22 |
| 2009/0210735 A1 * | 8/2009 | Brown et al. | ............... | 713/330 |

* cited by examiner

*Primary Examiner* — Scott Baderman
*Assistant Examiner* — Jason Bryan

(57) ABSTRACT

A system comprising a plurality of subsystems and a master power sequencer. Each of the plurality of subsystems is coupled to an associated power switch and an associated slave power sequencer. The master power sequencer is coupled to each of the slave power sequencers and each of the power switches. Upon a slave power sequencer identifying a fault with its associated subsystem, the master power sequencer determines whether to provide power to any other subsystem. Further, the master power sequencer is configured to send a signal to each of the power switches indicating whether to provide power to the subsystem associated with each of the power switches.

19 Claims, 4 Drawing Sheets

| Subsystem | Depends on? | Depended on by? |
|---|---|---|
| Agent 202 | --- | CPU1 204, CPU2 206, I/O 208, Cache 210 |
| CPU1 204 | Agent 202 | Memory1 212 |
| CPU2 206 | Agent 202 | Memory2 214 |
| I/O 208 | Agent 202 | --- |
| Cache 210 | Agent 202 | --- |
| Memory1 212 | CPU1 204 | --- |
| Memory2 214 | CPU2 206 | --- |

FIG. 3

FAULT TOLERANT POWER SEQUENCER

BACKGROUND

Certain enterprise-class servers utilize a chassis that houses many computing blades. Each computing blade may have multiple instances of major subsystems such as an agent subsystem, a central processing unit (CPU) subsystem, a memory subsystem, an I/O subsystem or a cache subsystem. Users of such servers often prefer high availability of system resources while maintaining a low cost per computing blade. It is possible that certain conditions may exist that cause one or more subsystems on a computing blade to fail to power-up properly. Alternatively, certain conditions may exist that cause one or more of the subsystems on a computing blade to fail after a power-up, forcing such failed subsystems to power-down. Either of these events may require the entire computing blade to power-down to protect the hardware contained on the computing blade, or for other reasons. Often, the computing blade will require service to be performed by a technician, and the delay between computing blade failure and the time when a technician is dispatched may be a number of days.

In this way, the failure of one or more subsystems on a computing blade during power-up, or a failure of a subsystem after power-up may render the entire computing blade unusable.

BRIEF DESCRIPTION OF THE DRAWINGS

For a detailed description of exemplary embodiments of the invention, reference will now be made to the accompanying drawings in which:

FIG. 3 shows an element of FIG. 1 in further detail in accordance with various embodiments.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
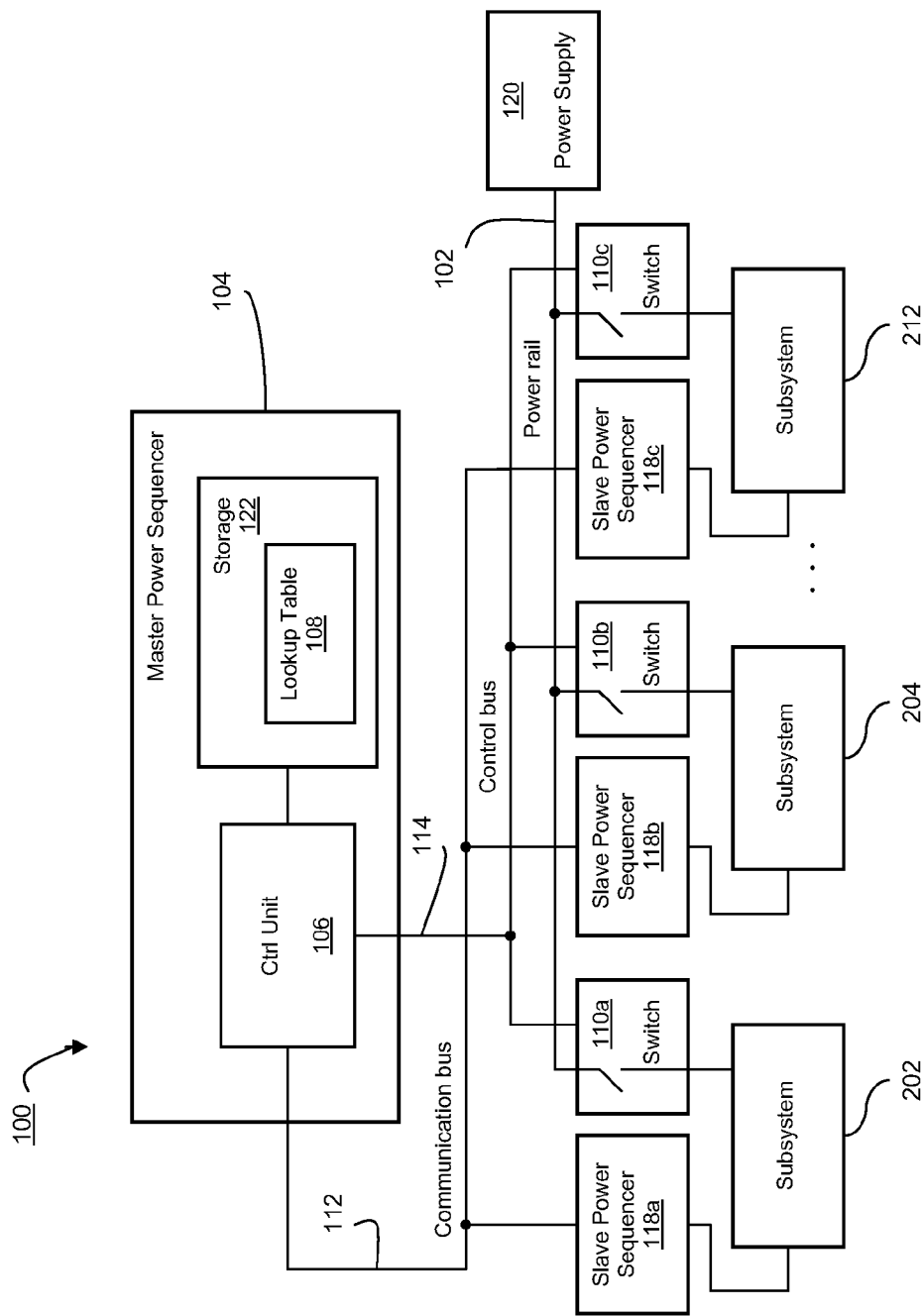
FIG. 1 shows a system in accordance with various embodiments.

FIG. 1 shows a system 100 in accordance with various embodiments. In some embodiments, system 100 comprises a computer such as a server. As shown, computer 100 comprises a power rail 102 that couples a power supply 120 to subsystems 202, 204, 212 by way of power switches 110a, 110b, 110c, respectively. Power switches 110a, 110b, 110c may comprise solid-state switches (such as field-effect transistors) or electromechanical relays. In some embodiments, the power supply 120 comprises a 12-volt direct current (DC) power supply, but could be of a different voltage or comprise an alternating current (AC) power supply in other embodiments. The subsystems 202, 204, 212 couple to slave power sequencers 118a, 118b, 118c respectively. The slave power sequencers 118a, 118b, 118c communicate with a master power sequencer 104 by way of a communication bus 112. In some embodiments, the slave power sequencers 118a, 118b, 118c communicate with a control unit 106 of the master power sequencer 104. The communication bus 112 may comprise various communication signals such as a ready signal, a power-up enable signal, a signal indicating a successful power-up, a fault signal or other signal necessary to the operation of computer 100.

In accordance with various embodiments, the control unit 106 of the master power sequencer 104 couples to or otherwise accesses a lookup table 108 stored in storage 122. The control unit 106 also couples to power switches 110a, 110b, 110c by way of a control bus 114. Thus, the control unit 106 is able to regulate whether a particular subsystem 202, 204, 212 is provided with power from power rail 102 via the control bus 114.

In some embodiments, the subsystems 202, 204, 212 comprise subsystems of computer 100 (e.g., an agent subsystem, a central processing unit (CPU) subsystem, a memory subsystem, an I/O subsystem, a cache subsystem, etc.). In such embodiments, each subsystem 202, 204, 212 provides a portion of the computer's functionality. In some embodiments, at least one subsystem (e.g., the agent subsystem) is depended on in order for the other subsystems to be functional; that is, if the agent subsystem fails, for example due to a fault, no other subsystem is functional. In some embodiments, the agent subsystem comprises an application specific integrated circuit (ASIC). The agent subsystem may perform functions such as routing data between the other subsystems, distributing tasks between the other subsystems, etc. Other subsystems such as the memory subsystem 212 may depend on a given subsystem for functionality, such as a CPU subsystem 204 associated with the memory subsystem 212. However, not all subsystems of the computer 100 depend on the CPU subsystem 204 associated with a memory subsystem 212, thus the computer 100 may retain some functionality despite the failure of, for example, the CPU subsystem 204. The dependencies of various subsystems on one another give rise to a hierarchy of subsystems.

Figure 2:
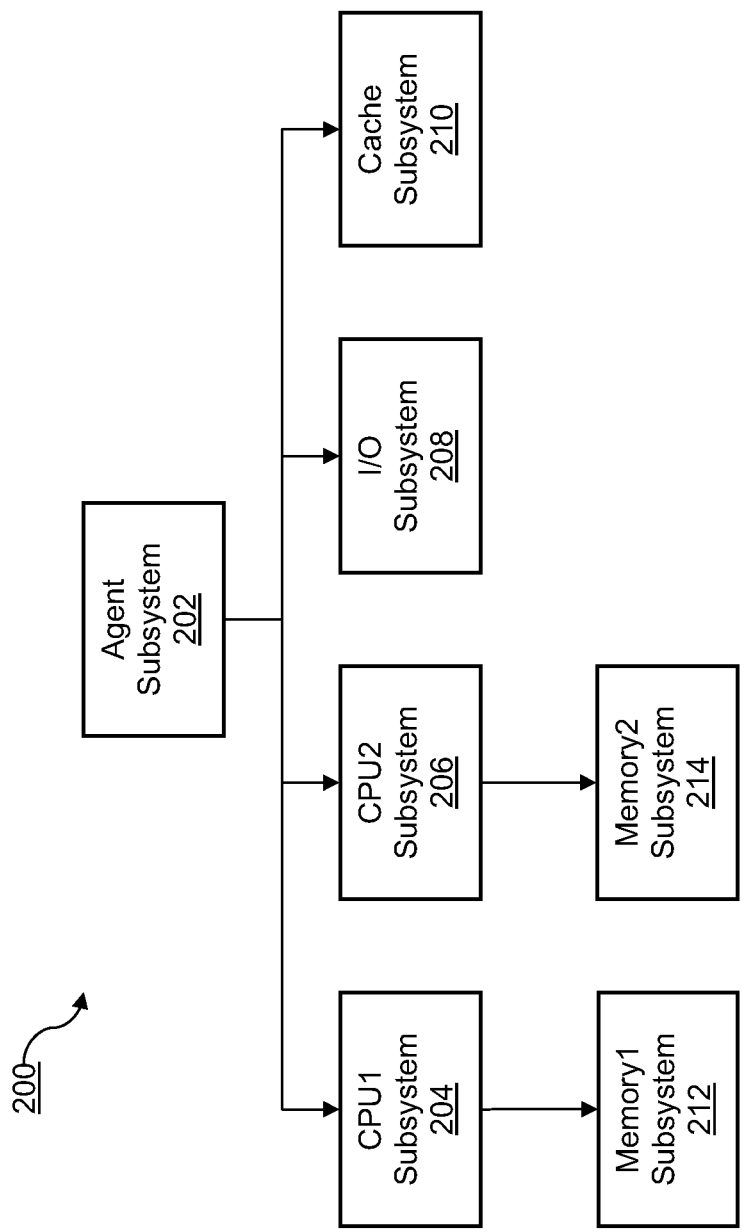
FIG. 2 shows a hierarchy of subsystems in accordance with various embodiments.

FIG. 2 shows a hierarchy 200 of subsystems in accordance with various embodiments. In some embodiments, the subsystems comprising hierarchy 200 are part of computer 100. A given subsystem's location in the hierarchy 200 is indicative of which other subsystems depend on the given subsystem, or are depended on by the given subsystem. The CPU1 subsystem 204, CPU2 subsystem 206, I/O subsystem 208 and cache subsystem 210 all depend on the agent subsystem 202 in the example of FIG. 2. In other words, if agent subsystem 202 experiences a fault, then none of the subsystems 204, 206, 208, 210 would be functional. Similarly, the Memory1 subsystem 212 depends on the CPU1 subsystem 204, and the Memory2 subsystem 214 depends on the CPU2 subsystem 206. Thus, if the CPU1 subsystem 204 or CPU2 subsystem 206 experiences a fault, or is rendered non-functional by a fault to the agent subsystem 202, then the Memory1 subsystem 212 or Memory2 subsystem 214 would not be functional. FIG. 2 is an example of a particular hierarchy 200; however, other hierarchical organizations could be similarly implemented. For example, a hierarchy might exist with additional subsystems or where more than one subsystem is depended on for all other subsystems' functionality.

The hierarchy 200, such as that described above, defines an order by which the subsystems 202-214 are powered up. The following uses the hierarchy 200 of FIG. 2 in explaining the power-up sequence of the subsystems. The first subsystem to be powered is the agent subsystem 202 since all other subsystems 204-214 depend on the functionality of the agent subsystem 202. Thus, if the agent subsystem 202 fails to power up, no other subsystem 204-214 will be powered up either. If the agent subsystem 202 successfully powers up, the next level of subsystems in the hierarchy are powered up. As such, if agent 202 powers up successfully, then subsystems 204-210 can be powered up. Generally, if any subsystem in this level fails to power up, the subsystems that depend on the failed subsystem will not be powered up. For example, if CPU1 subsystem 204 fails to power up, then Memory1 subsystem 212 that depends on CPU1 subsystem 204 will not be powered up. However, CPU2 subsystem 206, I/O subsystem 208 or cache subsystem 210, which are on the same hierarchical level as failed CPU1 subsystem 204 will be powered up, since they share a hierarchical layer with, and thus do not depend on, failed CPU1 subsystem 204. As an additional example, if the I/O subsystem 208 fails to power up, all other subsystems will be provided power since none of the other subsystems depend on the I/O subsystem 208 in the example of FIG. 2.

As discussed above, if the agent subsystem 202 fails to power up, no other subsystem 204-214 will be powered up. However, in some embodiments, there may be additional scenarios that would cause no subsystem 202-214 to be powered. For example, in some embodiments, if one of each associated CPU-memory subsystem pair (i.e., one of 204, 212 AND one of 206, 214) fails to power up, no subsystem will be powered up (and the agent subsystem, having been powered prior to attempting to power up the CPU and memory subsystems, will cease to be powered). In some embodiments, it is possible that other combinations of faults may render the computer 100 non-functional, and thus will cause no subsystem 202-214 to be powered.

In accordance with various embodiments, hierarchy 200 may comprise a number of tiers such as those depicted in FIG. 2. For example, a first tier may comprise the agent subsystem 202; a second tier may comprise the CPU1 subsystem 204, CPU2 subsystem 206, I/O subsystem 208 and cache subsystem 210; and a third tier may comprise the Memory1 subsystem 212 and Memory2 subsystem 214. In other embodiments, any extension of this tier structure based on increasing numbers of tiers is possible. In some embodiments, each subsystem of a given tier is associated with one subsystem in the tier above (i.e., each subsystem in the second tier is associated with a subsystem in the first tier, in this example, the agent tier). If a given subsystem fails, for example due to a fault, then any subsystem in a lower tier associated with the given subsystem will not be powered.

As discussed above, one or more of the subsystems 202-214 may experience a fault during operation of computer 100. The fault could occur during a power-up process (i.e., failing to power up), or once the computer 100 has successfully completed the power-up process. Such fault may be, for example, attributed to excess thermal stress on a hardware component of the subsystem 202-214, an over-current condition, an over- or under-voltage condition or a physical device failure. Although the above discussion addresses behavior during a power-up process, a fault may also occur during computer 100 operation; thus, instead of a subsystem not being powered up, a subsystem may cease to be powered.

FIG. 3 shows a more detailed representation of lookup table 108. In some embodiments, the lookup table 108 comprises a data structure defining the hierarchy 200 between subsystems 202-214. Such hierarchy 200 may be defined by linking each subsystem 202-214 to the subsystem(s) 202-214 on which it depends. The hierarchy 200 may be further defined by linking each subsystem 202-214 to the subsystem(s) 202-214 that depend on it. For example, it can be seen that agent subsystem 202 (first row) does not depend on any other subsystem and that CPU1 subsystem 204, CPU2 subsystem 206, I/O subsystem 208 and Cache subsystem 210 depend on agent subsystem 202. As an additional example, CPU1 subsystem 204 (second row) depends on agent subsystem 202 (also reflected in the first row, where agent subsystem 202 is depended on by CPU1 subsystem 204) and is depended on by Memory1 subsystem 212.

Referring back to FIG. 1, in some embodiments, each slave power sequencer 118a, 118b, 118c identifies a fault by receiving an indication from its associated subsystem 202, 204, 212. In other embodiments, each slave power sequencer 118a, 118b, 118c comprises a fault detection state machine. A fault occurring to one or more of the subsystems 202, 204, 212 causes a change in state of the slave power sequencer 118a, 118b, 118c associated with the faulty subsystem. In response, the slave power sequencer 118a, 118b, 118c associated with the faulty subsystem asserts a signal indicating the fault; this signal is transmitted to the master power sequencer 104 by way of the communication bus 112. In the absence of a fault, the slave power sequencer 118a, 118b, 118c asserts a signal indicating a successful power up, or that operation continues to be successful; this signal is similarly transmitted to the master power sequencer 104 by way of the communication bus 112.

The control unit 106 of the master power sequencer 104 receives the signal indicating the fault and determines, based on which slave power sequencer 118a, 118b, 118c identified the fault, whether to provide (if not already powered up) or continue to provide (if already powered up) power to the other subsystems 202, 204, 212 (additionally, the control unit 106 may automatically determine to stop providing power to the subsystem 202, 204, 212 that experienced the fault). This determination may be made, for example, by accessing the lookup table 108 of the master power sequencer 104. Based on the determination of the control unit 106, a signal will be sent to each power switch of the other (i.e., non-faulting) subsystems by way of the control bus 114. If the determination is not to provide power, the signal will open the power switch; likewise, if the determination is to provide power, the signal will close the power switch.

As an illustration of the above system functionality, subsystem 202 comprises an agent subsystem 202 on which all other subsystems depend, and subsystems 204, 212 comprise other subsystems of the computer. If subsystem 202 experiences a fault, either during power-up or during operation, the agent subsystem's slave power sequencer 118a identifies the fault. This causes the slave power sequencer 118a to assert a signal indicating the fault and transmit the signal to the master power sequencer 104 by way of the communication bus 112. The control unit 106 responds by accessing the lookup table 108 to determine the hierarchical location of subsystem 202. Upon determining, based on the lookup table 108, that subsystem 202 is the agent subsystem, the control unit 106 determines not to provide power to the other subsystems 204, 212 because all subsystems depend on the agent subsystem 202 for functionality (directly, or indirectly as with Memory1 subsystem 212 and Memory2 subsystem 214). The control unit 106 then asserts a signal on control bus 114 that causes power switches 110b, 110c to open, thereby not providing or ceasing to provide power to all other subsystems 204, 212. In some embodiments, the control unit 106 receiving the signal indicating a fault to agent subsystem 202 causes the control unit 106 to automatically assert a signal on control bus 114 that causes agent subsystem's power switch 110a to open.

As explained above, subsystem 202 comprises an agent subsystem on which all other subsystems depend, and subsystems 204, 212 comprise a CPU and a memory subsystem respectively. In some embodiments, memory subsystem 212 depends on CPU subsystem 204 to function. In some situations, agent subsystem 202 does not experience a fault; however CPU subsystem 204 does experience a fault. Thus, the agent subsystem's power sequencer 118a asserts a signal indicating a successful power up, or successful continued operation and transmits the signal to the master power sequencer 104 by way of communication bus 112. The control unit 106 responds by asserting a signal on control bus 114 that causes the agent subsystem's power switch 110a to close or remain closed, thereby providing or continuing to provide power to the agent subsystem 202.

Continuing the above example, the CPU subsystem's slave power sequencer 118b identifies the fault. The slave power sequencer 118b responds to the fault by asserting a signal indicating the fault and transmitting the signal to the master power sequencer 104 by way of the communication bus 112. The control unit 106 responds by accessing the lookup table 108 to determine the hierarchical location of subsystem 204. Upon determining, based on the lookup table 108, that subsystem 204 is the CPU subsystem and that memory subsystem 212 depends on CPU subsystem 204 to function, the control unit 106 determines not to provide power to the memory subsystem 212. The control unit 106 then asserts a signal on control bus 114 that causes the memory subsystem's power switch 110c to open, thereby not providing or ceasing to provide power to the memory subsystem 212. In some embodiments, the control unit 106 receiving the signal indicating a fault to CPU subsystem 204 causes the control unit 106 to automatically assert a signal on control bus 114 that causes the CPU subsystem's power switch 110b to open. In this way, some computer 100 functionality is maintained, since agent subsystem 202 remains powered, despite a subsystem 204 fault.

By way of an additional example, neither subsystem 202, 204 experiences a fault; however memory subsystem 212 does experience a fault. Thus, the agent and CPU subsystems' power sequencers 118a, 118b assert signals indicating a successful power up, or successful continued operation and transmit the signals to the master power sequencer 104 by way of communication bus 112. The control unit 106 responds by asserting a signal on control bus 114 that causes the agent subsystems' power switches 110a, 110b to close or remain closed, thereby providing or continuing to provide power to the agent and CPU subsystems 202, 204.

Continuing the above example, the memory subsystem's slave power sequencer 118c identifies the fault. The slave power sequencer 118c responds by asserting a signal indicating the fault and transmitting the signal to the master power sequencer 104 by way of the communication bus 112. The control unit 106 responds by accessing the lookup table 108 to determine the hierarchical location of subsystem 212. Upon determining, based on the lookup table 108, that subsystem 212 is the memory subsystem 212 and that no subsystem depends on memory subsystem 212 to function, the control unit 106 determines not to provide power to only the memory subsystem 212. The control unit 106 responds by asserting a signal on control bus 114 that causes the memory subsystem's power switch 110c to open, thereby not providing or ceasing to provide power to the memory subsystem 212. In this way, some computer 100 functionality is maintained, since agent and CPU subsystems 202, 204 remain powered, despite a memory subsystem 212 fault.

Figure 4:
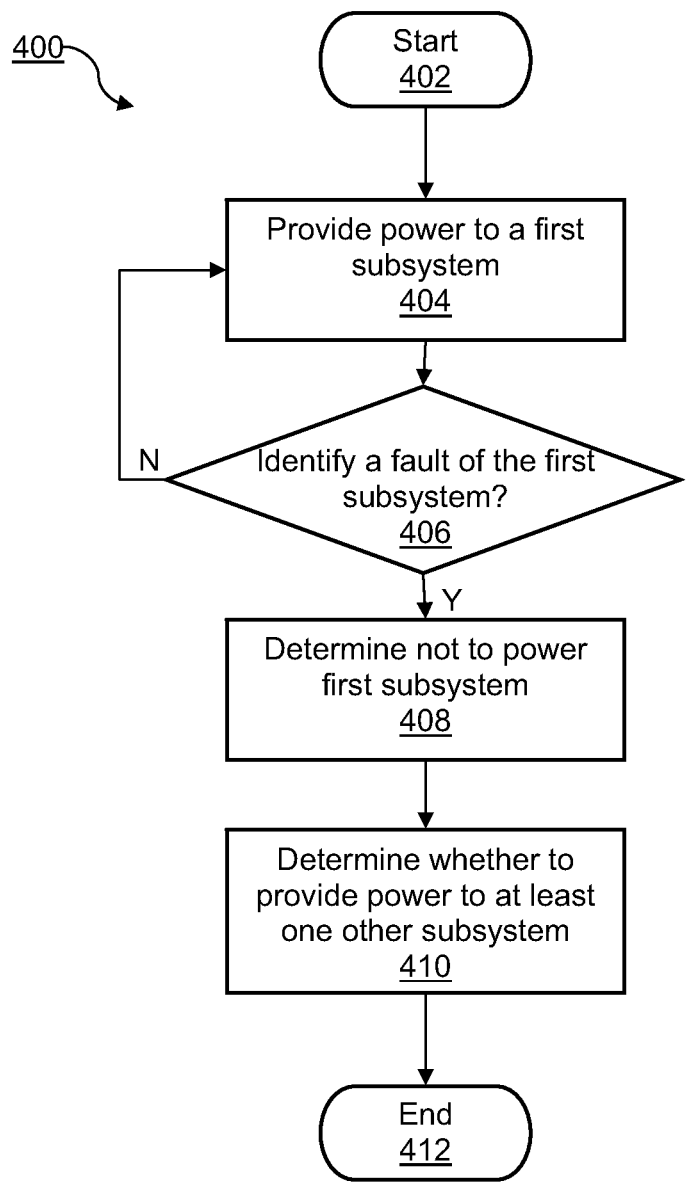
FIG. 4 shows a method in accordance with various embodiments.

FIG. 4 shows a method 400 in accordance with various embodiments. The method 400 starts (block 402) when master power sequencer 104 receives power and proceeds to providing power to a first subsystem (e.g., 202) (block 404). In some embodiments, the lookup table 108 of the master power sequencer 104 contains a data structure defining a hierarchy of subsystems 202-214. In some embodiments, one subsystem (e.g., agent subsystem 202) is depended on by the other subsystems 204-214 for subsystems 204-214 to be functional; in other words, the other subsystems 204-214 depend on agent subsystem 202. The agent subsystem 202 is powered up first, as indicated by the lookup table 108, by sending a signal from master power sequencer 104 to close power switch 110a. Assuming a successful power up of agent subsystem 202, other subsystems 204-214 will be powered up based on their hierarchical layer. In some embodiments, the agent subsystem's slave power sequencer 118a may send a signal to control unit 106 indicating a successful power up. Again, the lookup table 108 defines the hierarchy of subsystems 202-214 and thus defines the order in which the subsystems 202-214 are powered up. In some embodiments, power is provided by a power rail 102 by way of a power switch 110a.

The agent subsystem 202 is coupled to slave power sequencer 118a. The slave power sequencer 118a may comprise a fault detection state machine. Any of the faults in the discussion of FIG. 1 to subsystem 202 cause a change in state of the associated slave power sequencer 118a which in turn causes the slave power sequencer 118a to assert a signal indicating the fault. This signal is transmitted to the master power sequencer 104 by way of the communication bus 112. If the slave power sequencer 118a does not identify a fault (decision block 406), and thus does not change state, control reverts to providing power to the first subsystem 202 (block 404).

In some embodiments a fault occurs during operation of computer 100 or during start-up of computer 100. The slave power sequencer 108a identifying a fault (decision block 406) causes the slave power sequencer 118a to assert a signal indicating the fault and transmit the signal to the master power sequencer 104 by way of communication bus 112. The master power sequencer 104 directs the signal to control unit 106, causing control unit 106 to access the lookup table 108 to determine the hierarchical location of subsystem 202. In some embodiments, the control unit 106 receiving the signal indicating a fault to subsystem 202 causes the control unit 106 to automatically assert a signal on control bus 114 that causes power switch 110a to open, thereby not providing or ceasing to provide power to subsystem 202 (block 408). Based on the hierarchical location of subsystem 202, defined in the lookup table 108, the control unit 106 determines whether to provide power to at least one other subsystem (e.g., 204, 212) (block 410).

If the lookup table indicates that subsystems 204, 212 are not operable independent of subsystem 202, the control unit 106 determines not to provide power to subsystems 204, 212. In this case, the control unit 106 asserts a signal on control bus 114 that causes power switches 110b, 110c to open. Conversely, if subsystems 204, 212 are operable independent of subsystem 202 (i.e., they do not depend on 202 for their operability), the control unit 106 asserts a signal on control bus 114 that causes power switches 110b, 110c to close, thereby providing power to subsystems 204, 212. After the determination is made by the control unit 106 of master power sequencer 104, the method 300 ends (block 412).

The above discussion refers to, at times, only subsystems 202, 204, 212. It should be understood that this is for illustrative purposes only; FIG. 1 and the associated discussion may be expanded to illustrate the entire hierarchy 200 of FIG. 2, or any other hierarchical model of various subsystems.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a computing blade comprising:
      a plurality of subsystems comprising a central processing unit (CPU) subsystem, a memory subsystem, an input/output (I/O) subsystem, and a cache subsystem;
      a power switch coupled to each subsystem;
      a slave power sequencer coupled to each subsystem; and
      a master power sequencer coupled to:
         each of said slave power sequencers; and
         each of said power switches;
      wherein upon a slave power sequencer identifying a fault at its associated subsystem, said master power sequencer determines whether to provide power to any other subsystem;
      wherein said master power sequencer is configured to send a signal to each of said power switches indicating whether to provide power to said subsystem associated with each of said power switches; and
      wherein said fault comprises excess thermal stress on a hardware component of the associated subsystem, an over-current condition of a hardware component of the associated subsystem, an over- or under-voltage condition of a hardware component of the associated subsystem, or a physical device failure of a hardware component of the associated subsystem.

2. The system of claim 1 wherein said master power sequencer determines not to provide power to said subsystem experiencing the fault.

3. The system of claim 1 wherein said master power sequencer further comprises a data structure, said data structure defines a hierarchy of said plurality of subsystems.

4. The system of claim 3 wherein said master power sequencer determines whether to provide power to any other subsystem based on said hierarchy defined in said data structure.

5. The system of claim 1 wherein:
   said plurality of subsystems comprises a first tier and a second tier, each subsystem in said second tier associated with one subsystem in said first tier;
   each subsystem in said second tier depends on a subsystem in said first tier to function; and
   upon said slave power sequencer associated with one of said first tier subsystems identifying a fault, said master power sequencer determines not to provide power to any second tier subsystem depending on said one of said first tier subsystems.

6. The system of claim 1 wherein:
   said plurality of subsystems comprises a first tier and a second tier, each subsystem in said second tier associated with one subsystem in said first tier;
   said first tier comprises an agent subsystem; and
   upon said slave power sequencer associated with said agent subsystem identifying a fault, said master power sequencer determines not to provide power to any other subsystem.

7. The system of claim 1 further comprising a plurality of CPU subsystems, each of said plurality of CPU subsystems associated with one of a plurality of memory subsystems, thereby defining a plurality of associated pairs of CPU subsystems and memory subsystems.

8. The system of claim 7 wherein upon said slave power sequencer of either said CPU subsystem or memory subsystem of each of said plurality of associated pairs identifying a fault, said master power sequencer determines not to provide power to any other subsystem.

9. The system of claim 1 wherein said master power sequencer determines whether any of said plurality of subsystems is operable independent of said subsystem experiencing the fault.

10. The system of claim 9 wherein said master power sequencer determines to provide power to any subsystem that is operable independent of said subsystem experiencing the fault.

11. The system of claim 9 wherein said master power sequencer determines operability based on a data structure, said data structure defining a hierarchy of said plurality of subsystems.

12. A method comprising:
   providing, by a power rail, power to a first subsystem of a co in blade coupled to a slave power sequencer;
   identifying, by said slave power sequencer, a fault at said first subsystem; and
   based on identifying said fault:
      determining, by a master power sequencer of the computing blade, not to provide power to said first subsystem; and
      determining, by the master power sequencer, whether to provide power to a plurality of other subsystems;
   wherein said first subsystem and said plurality of other subsystem comprises of a central processing unit (CPU) subsystem, a memory subsystem, an input/output (I/O) subsystem, and a cache subsystem; and
   wherein said fault comprises excess thermal stress on a hardware component of the associated subsystem, an over-current condition of a hardware component of the associated subsystem, an over- or under-voltage condition of a hardware component of the associated subsystem, or a physical device failure of a hardware component of the associated subsystem.

13. The method of claim 12 wherein determining, by said master power sequencer further comprises determining whether to provide power to any other subsystem based on a hierarchy defined in a data structure.

14. The method of claim 12 wherein determining whether to provide power further comprises determining whether any of said at least one other subsystem is operable independent of said first subsystem.

15. An apparatus comprising:
a computing blade comprising a control unit; and
a data structure accessible to said control unit;
wherein said control unit is configured to:
receive a signal indicating the presence or absence of a fault at a first subsystem of the computing blade from a slave power sequencer associated with the first subsystem; and
determine, based on said signal and on said data structure, whether to provide power to said first subsystem associated with said slave power sequencer and a plurality of other subsystems; and
wherein said first subsystem and said plurality of other subsystems comprises a central processing unit (CPU) subsystem, a memory subsystem, an input/output (I/O) subsystem, and a cache subsystem; and
wherein said fault comprises excess thermal stress on a hardware component of the associated subsystem, an over-current condition of a hardware component of the associated subsystem, an over- or under-voltage condition of a hardware component of the associated subsystem, or a physical device failure of a hardware component of the associated subsystem.

16. The apparatus of claim 15 wherein said control unit is configured to send a signal to a power switch indicating whether to provide power to a subsystem associated with said power switch.

17. The apparatus of claim 15 wherein said signal indicating the presence of a fault causes said control unit to:
determine not to provide power to said first subsystem experiencing the fault;
determine whether said at least one other subsystem is operable independent of said first subsystem experiencing the fault; and
if said at least one other subsystem is not operable independent of said first subsystem experiencing the fault, determine not to provide power to said at least one other subsystem.

18. The apparatus of claim 15 wherein said data structure further comprises a hierarchical organization of said first subsystem associated with the slave power sequencer and said at least one other subsystem; and
said hierarchical organization comprises at least a first tier and a second tier, each subsystem in the second tier associated with a subsystem in the first tier.

19. The apparatus of claim 18 wherein said signal indicating the presence of a fault causes said control unit to:
determine not to provide power to said first subsystem experiencing the fault;
determine whether said first subsystem experiencing the fault is in said first tier; and
if said first subsystem experiencing the fault is in said first tier, determine not to provide power to any of said at least one other subsystem that is in said second tier and is associated with said first subsystem experiencing the fault.

* * * * *

UNITED STATES PATENT AND TRADEMARK OFFICE
CERTIFICATE OF CORRECTION

PATENT NO. : 8,533,528 B2
APPLICATION NO. : 12/639801
DATED : September 10, 2013
INVENTOR(S) : David Maciorowski Page 1 of 1

It is certified that error appears in the above-identified patent and that said Letters Patent is hereby corrected as shown below:

In the Claims:
In column 8, line 43, in Claim 12, delete "co in" and insert -- computing --, therefor.

Signed and Sealed this
Fourteenth Day of January, 2014

Michelle K. Lee
*Deputy Director of the United States Patent and Trademark Office*